United States Patent

Johnson et al.

[11] 3,971,540
[45] July 27, 1976

[54] CONTROL VALVE AND MOUNTING ASSEMBLY FOR AN APPLIANCE

[75] Inventors: Philip Paul Johnson; William F. Gourdeau; Ronald E. Hahn, all of St. Joseph, Mich.

[73] Assignee: Whirlpool Corporation, Benton Harbor, Mich.

[22] Filed: Oct. 4, 1974

[21] Appl. No.: 511,989

[52] U.S. Cl. .............................. 251/143; 251/148; 134/186
[51] Int. Cl.² .................... F16L 15/00; F16K 51/00
[58] Field of Search ........... 137/343, 374; 251/129, 251/143, 148; 285/61; 174/5 R, 5 SG; 134/186

[56] References Cited
UNITED STATES PATENTS

| | | | |
|---|---|---|---|
| 3,195,561 | 7/1965 | Sovitzky | 137/315 |
| 3,357,678 | 12/1967 | Dyki | 251/143 X |
| 3,747,893 | 7/1973 | Long | 251/148 |
| 3,844,536 | 10/1974 | Chadwick, Jr. | 174/5 SG X |

*Primary Examiner*—William R. Cline
*Attorney, Agent, or Firm*—Hill, Gross, Simpson, Van Santen, Steadman, Chiara & Simpson

[57] ABSTRACT

A control valve assembly for an appliance includes a control valve and a swivel garden hose type connector for releasably connecting the fluid inlet of the control valve to external plumbing. The connector is securely and permanently affixed to a mounting bracket which is affixed to the cabinet of the appliance and is adapted for connection to the external plumbing by an internal thread. The integral connection of the connector and mounting bracket isolates the torque generated in securing the external plumbing to the connector and transmits the torque via the mounting bracket to the appliance cabinet. The swivel connector provides for ease in installation and/or replacement of the control valve. A grounding strap connected at one end to the control valve and to a predetermined location of the mounting bracket physically orients the fluid outlet of the control valve to a proper position for connection to a conduit which carries fluid from the control valve to a washing chamber of the appliance.

6 Claims, 5 Drawing Figures

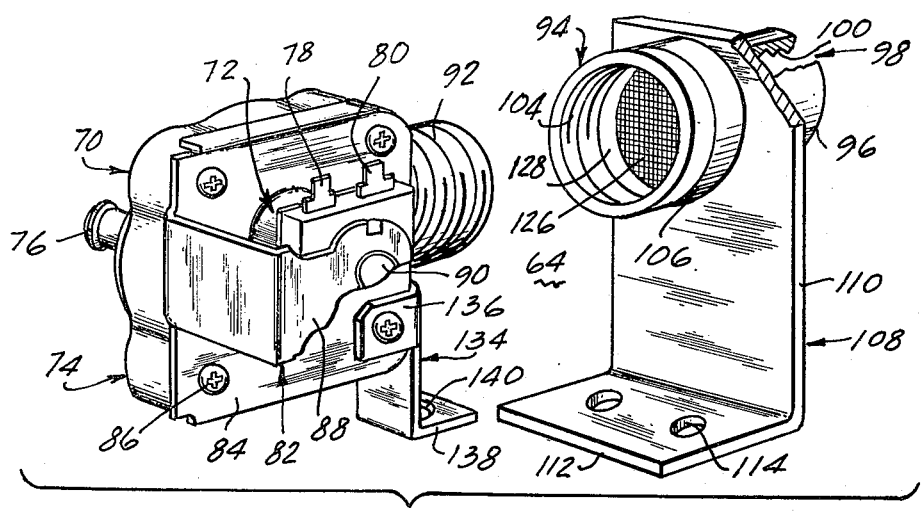
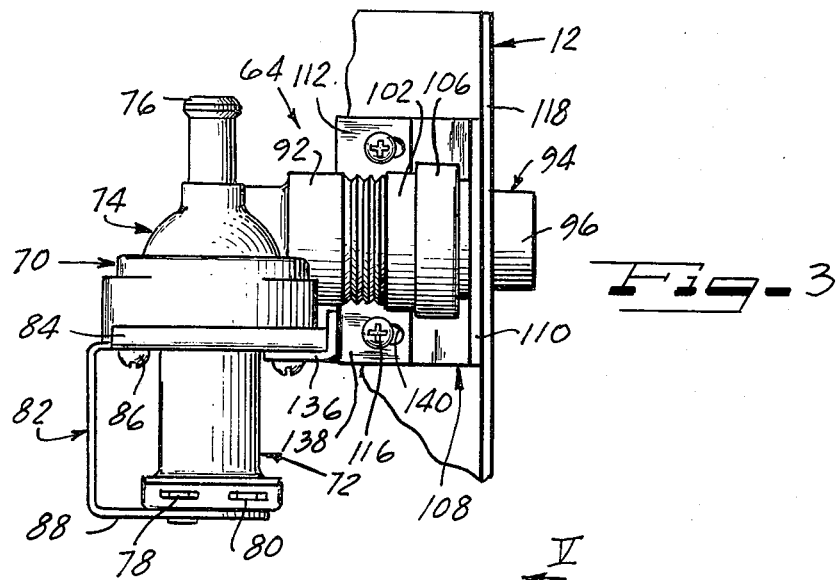
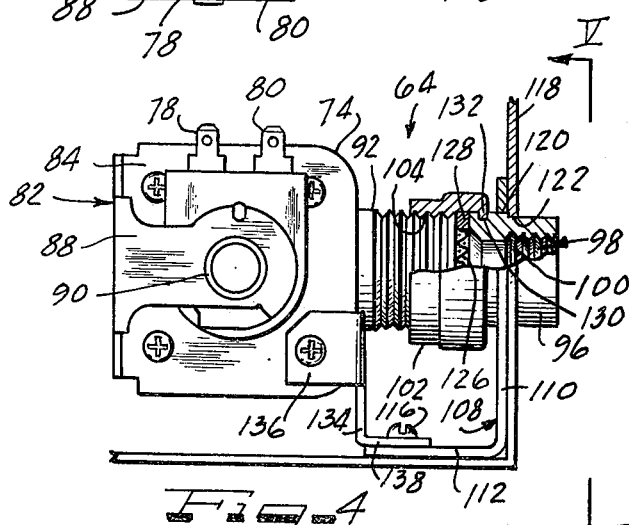
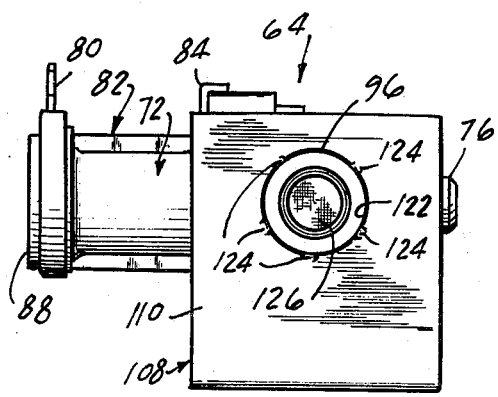

CONTROL VALVE AND MOUNTING ASSEMBLY FOR AN APPLIANCE

BACKGROUND OF THE INVENTION

1. Field of the Invention

This invention relates to a control valve assembly, and more particularly to a control valve assembly for use as a water inlet valve for a washing appliance in which the assembly isolates the torque generated in making a threaded connection to external plumbing from the valve and transmits this torque to the appliance cabinet.

2. Description of the Prior Art

Fluid control valves have long been used in the art to selectively control a flow of fluid from an external source to a washing chamber of an appliance such as an automatic washer or automatic dishwasher. Such valves are usually mounted on the interior surface of a cabinet wall and include a fluid inlet which extends through the cabinet wall for connection to external plumbing. When the connection to external plumbing is a threaded connection, problems have arisen in situations where the torque generated in effecting such connection is transmitted to the valve. These problems were recognized and dealt with for example, by R. Sovitzky in U.S. Pat. No. 3,195,561 which discloses the utilization of a mounting bracket and a non-rotatable association between the mounting bracket and the fluid inlet of a control valve. The control valve is therefore isolated from the torque created in fastening the valve to external plumbing by this non-rotatable association. Similar structures are also taught by R. H. Eklund in U.S. Pat. No. 2,927,602 and J. A. Kozel in U.S. Pat. No. 3,396,848.

Inasmuch as fluid control valves for washing appliances are generally electrically operated solenoid valves, and inasmuch as an operator must be protected from the hazards of electrical shock, practical applications of these control valves have included the provision of a grounding connection between the electrically operated solenoid and the appliance cabinet. These grounding connections have been in the form of a flexible wire with eyelet or horseshoe shape terminals to receive a screw-type fastening device. Physical embodiments of control valves, such as disclosed by the aforementioned Sovitzky patent, presently utilize such grounding conductors.

In many appliance applications, particularly those in which the fluid inlet and fluid outlet of the control valve are not disposed in the same general direction, for example at an angle of 90°, it is of particular convenience to an appliance assembler and to service personnel, to be provided with some index of proper valve orientation. One such technique for providing proper valve orientation is disclosed by C. E. Lyall et al. in their U.S. Pat. No. 3,441,047.

Other art concerning fluid control valves which may be of interest to the reader may be had by referring to U.S. Pat. Nos. 3,357,678; 3,381,700 and Re. 25,272.

SUMMARY OF THE INVENTION

The primary object of the present invention is to provide a new and improved control valve assembly for use in an appliance.

Another object of the invention is to provide a control valve assembly in which the valve structure per se is isolated from torque generated in effecting connections to external plumbing.

Another object of the invention is to provide a control valve assembly in which the control valve fluid outlet is properly oriented for ease of connection to a fluid conduit extending between the control valve and a fluid-receiving portion of an appliance.

Still another object of the invention is to provide, in conjunction with proper orientation of the valve, electrical grounding of the valve to the cabinet of the appliance.

According to the invention, a control valve assembly comprises an electrically operated solenoid valve having a threaded fluid input, a garden hose type female connector having an internally threaded portion for releasable engagement with the threaded inlet of the valve and a hollow portion including an internal thread for connection to external plumbing. The hollow portion is permanently affixed to a mounting bracket which serves to secure the valve assembly to an appliance cabinet and transmit to the cabinet torque which may be affected in making a fluid connection to external plumbing.

The solenoid valve is provided with a grounding conductor attached to the valve and to the mounting bracket. The grounding conductor is in the form of a substantially rigid strap which is affixed at one end to the solenoid valve and at the other end to a particular location on the mounting bracket. The rigidity of the strap and its connection to the mounting bracket provide proper orientation of the valve with respect to a fluid conduit associated with the fluid outlet of the valve.

BRIEF DESCRIPTION OF THE DRAWINGS

Other objects, features and advantages of the invention, its organization, construction and operation will be best understood from the following detailed description taken in conjunction with the accompanying drawings, on which:

FIG. 2 is a perspective exploded view of a fluid control valve assembly constructed in accordance with the principles of the present invention;

FIG. 3 is a top view of the valve structure of FIG. 2 illustrated in an assembled and mounted condition;

FIG. 4 is an end view of the apparatus illustrated in FIG. 3; and

FIG. 5 is a view taken substantially in the direction of the lines V—V of FIG. 4, shown with the appliance cabinet portion removed.

DESCRIPTION OF THE PREFERRED EMBODIMENT

Figure 1:
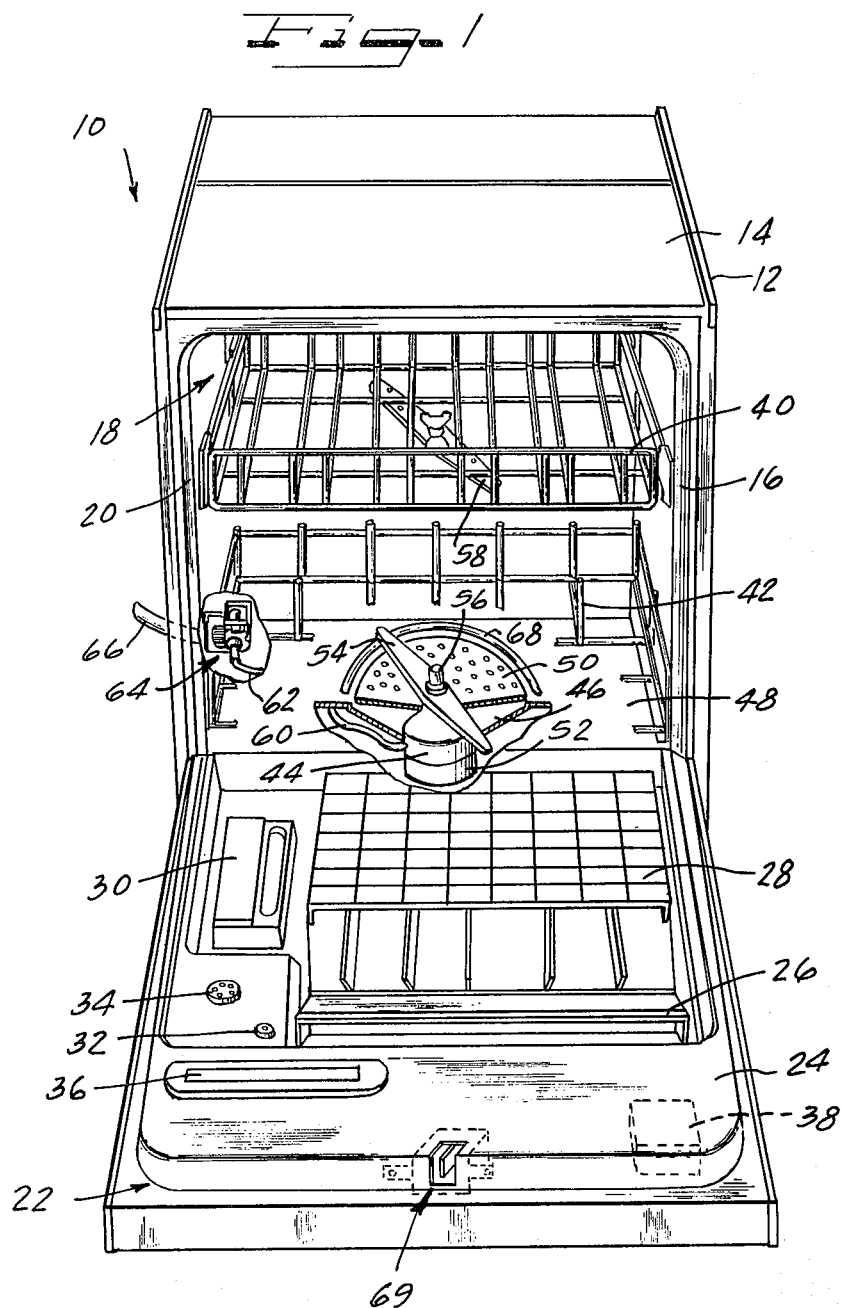
FIG. 1 illustrates a front loading dishwasher with the access door in an open position and with portions of the dishwasher broken away for the purpose of illustration.

Referring to FIG. 1, a front loading dishwasher 10 comprises a cabinet 12 having a top 14. The cabinet 12 is provided with an opening 16 on one side which allows entry into a washing chamber or enclosure 18. The opening 16 is provided with a seal or gasket 20 which extends around the sides and top of the opening. To close the opening 16, a closure such as a hollow door 22 is pivotally connected to the bottom of the opening and is movable from a position illustrated in FIG. 1 to a position closing the opening 16. When in the closed position, an inner panel 24 of the door 22 tightly engages the gasket 20 to provide a sealing condition to prevent leakage of water from the chamber 18.

As illustrated on the drawing, the inner panel 24 of the door 22 has mounted thereon silverware baskets 26 and 28, a detergent dispenser 30, a rinse additive dispenser having a filling cap 32 and a discharge opening 34, and a vent opening 36 which allows hot humid air to escape from the chamber 18 during a drying cycle. Mounted in the hollow door 22 beneath the panel 24 is a timer 38 which is utilized to control various cycles of washing, draining, rinsing and drying, along with the dispensing of the rinse additive.

Within the washing chamber 18 are movable dishracks 40 and 42. To provide a spray of washing and rinsing liquid to the dishes in the racks 40 and 42, a pump 44 is disposed in a recessed or depressed sump area 46 in a bottom wall 48 of the chamber 18. To remove food particles from the liquid prior to being circulated by the pump, a filter screen 50 is provided. The pump 44, which is driven by a motor 52, has two pump chambers (not shown) to provide washing liquid under pressure to a lower spray arm 54 and through a column or tower (indicated at 56) to an upper spray arm 58 which is attached beneath the upper dishrack 40 by a mount which enables the arm 58 to be free to rotate. The pump 44 which provides washing liquid under pressure to the spray arms 54 and 58 during a washing cycle, pumps the washing liquid to a drain (not shown) through a discharge conduit 60 during a draining or pump out portion of the cycle. To fill the washing chamber 18, washing liquid is introduced from an appropriate source by a conduit 66 to pass through an inlet valve 64 and a conduit 62 to an inlet opening (not shown) which is provided in a wall of the chamber 18. The valve 64 contains a flow control washer to limit the flow through the valve to a given flow rate. A heating element 68 is provided in the chamber 14 to heat the washing liquid during the wash cycle and to heat the air within the chamber 18 during a drying cycle.

To hold the door 22 in a sealing position on the gasket or seal 20, a latch device, generally indicated at 69 is provided. Any one of a variety of latch structures may be utilized and inasmuch as the same does not form a part of the present invention, further detailed treatment will not be given here. However, one may take reference to Spiegel et al. United States patent application Ser. No. 385,051, filed Aug. 2, 1973 and assigned to Whirlpool Corporation for details of a particularly suitable latch mechanism.

Referring to FIGS. 2–5, a control valve structure which may be utilized for the control valve assembly 64 in FIG. 1 is illustrated in detail as comprising a solenoid valve 70, a swivel type fluid connector 94, a mounting bracket 108 and a grounding and orientation strap 134.

More specifically, the control valve 70 includes a solenoid 72 and a valve body 74 having a fluid outlet 76 for discharging a flow of fluid under the control of the solenoid 72. The solenoid 72 also includes a pair of electrical terminals 78 and 80 for connection to an electrical supply for energizing the solenoid, and a bracket or strap 82 which serves to complete the magnetic circuit of the solenoid core 90. The yoke bracket 82 includes a first portion 84 which is secured to the valve body 74 by suitable fastening means, such as by the screws 86, and a portion 88 which is connected to the core 90.

The valve body 74 includes a threaded fluid inlet 92 for connection to the swivel garden hose type fluid connector 94.

The fluid connector (swivel connector) 94 comprises a fixed portion 96 including a fluid passageway 98 and an internal thread 100 for connection to external plumbing. An annular rotatably-mounted portion 102 includes a female threaded portion 104 for threaded engagement with the threaded fluid inlet 92 of valve body 74, and may advantageously be provided with a knurled section 106 for ease of engagement and disengagement with the fluid inlet 92. The annular portion 102 includes an in-turned flange 132 which bears against a flange or shoulder 130 of the portion 96 and is rotatable about the portion 96 while in abutting contact with the shoulder 130 to draw the connector 94 into engagement with the threaded inlet 92 of the valve body 74.

The connector 94 is integrally constructed with an L-shaped mounting bracket 108 having a leg 110 and a leg 112. The leg 112 includes holes 114 for receiving fastening means, such as a number of screws 116 to secure the mounting bracket to the cabinet 12 in FIGS. 3 and 4 represented by a cabinet portion 118. The leg 110 includes an aperture 122 which is aligned with a similar aperture 120 in the cabinet portion 118 to receive the fixed portion 96 of the connector therethrough for access and connection to the external plumbing.

As illustrated in FIG. 5, the fixed portion 96 of the connector 94 is permanently secured to the leg 110 of the mounting bracket 108, as by staking 124, welding, or other suitable means. With the fixed portion 96 secured to the bracket 108, and the bracket 108 secured to the cabinet 12 via cabinet portion 118, any torque developed in connecting the external plumbing will be isolated from the valve and transmitted to the appliance cabinet.

Referring to FIGS. 2 and 4 in particular, liquid line filtering is provided by means of a filter screen 126 disposed within the movable portion 102 of the connector 94 and across the passageway 98 of the portion 96. Also, in order to provide a fluid seal between the connector 94 and the fluid inlet 92, an annular seal 128 is provided within the rotatable annular part 102 for compression between the portion 96 and the fluid inlet 92.

In order to properly orient the valve, more particularly the fluid outlet 76, with respect to a conduit, such as the conduit 62 in FIG. 1, the valve 70 is provided with an adjustable registration device. This device is in the form of a strap 134 having a first end 136 secured to the valve 70 and a second end 138 having an elongate opening 140 therein for attachment to the cabinet by means of at least one of the screws 116 which extend through the mounting bracket hole 114 of the mounting bracket leg 112. In order to prevent electrical shock hazards, the strap 134 is constructed of conductive material to electrically connect or ground the conductive yoke portion 84 to the cabinet.

An additional advantage arises from the permanent affixation of the connector and mounting bracket in that the valve 70 may be replaced during servicing of the appliance without disconnecting the external plumbing. This is of particular advantage in installations where rigid plumbing is employed.

Although we have described our invention by reference to a particular illustrative embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

The embodiments of the invention in which an exclusive property or privilege is claimed are defined as follows:

1. A control valve assembly for controlling the flow of liquid supplied under pressure from external plumbing through a conduit to a washing area within the cabinet of an appliance, said control valve assembly comprising:
   an electrically operated control valve for selectively providing fluid communication between the external plumbing and the conduit;
   a swivel connector including
      a mounting bracket for attaching said connector to the cabinet, said mounting bracket including first and second portions,
      a fixed portion having a fluid passageway therein for connection to the external plumbing, said fixed portion connected to said first portion of said mounting bracket, and
      a movable portion releasably connecting said fixed portion in communication with said control valve; and
   grounding means connecting said control valve to the cabinet,
      said grounding means including an adjustable registration device orienting said control valve with respect to the cabinet and placing said control valve and the cabinet at the same electrical potential, said grounding means electrically connected to said control valve and including a portion commonly connected to the cabinet with said second portion of said mounting bracket.

2. A control valve assembly according to claim 1, wherein said control valve includes a threaded inlet and said movable portion is threaded and rotatably mounted on said fixed portion for threaded engagement with said threaded inlet.

3. A control valve assembly according to claim 1, wherein said mounting bracket is an L-shaped bracket with said first and second portions thereof extending at right angles with respect to each other.

4. A washing appliance including a cabinet, a washing chamber within the cabinet, an electrically operated fluid valve assembly having a fluid inlet for connection to external plumbing for providing fluid under pressure from a fluid source to said valve assembly and a fluid outlet, and an outlet conduit connecting said fluid outlet in communication with said washing chamber, said fluid valve assembly comprising:
   a control valve for controlling fluid flow therethrough to said washing chamber;
   a mounting bracket including a first portion, and a second portion attached to the cabinet;
   a fluid connector fixed to said mounting bracket and including
      a fixed portion connected to said first portion of said mounting bracket and coupled to the external plumbing, and a movable portion mounted on said fixed portion and operable to releasably engage said fluid inlet of said control valve; and
   a rigid conductive strap including a first portion electrically connected at one end to said control valve and a second portion electrically connected at the other end to the cabinet in common with said first portion of said mounting bracket for grounding and orienting said control valve with respect to said cabinet.

5. A washing appliance as claimed in claim 4, wherein said fluid inlet of said control valve includes a threaded outer surface and said movable portion of said connector is rotatably mounted on said fixed portion and includes a female threaded portion for releasably securing said fluid inlet to said connector.

6. A washing appliance as claimed in claim 5, wherein said fixed portion of said connector includes internal threads for connection to the external plumbing, said fixed portion transmitting the torque required to secure the last-mentioned connection to said mounting bracket and cabinet and isolate such torque from said control valve.

* * * * *